(12) United States Patent
Matsunaga et al.

(10) Patent No.: US 7,903,845 B2
(45) Date of Patent: Mar. 8, 2011

(54) ELECTRONIC APPARATUS AND PROGRAM STORAGE MEDIUM

(75) Inventors: Satoshi Matsunaga, Kawasaki (JP); Katsunori Masamune, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1026 days.

(21) Appl. No.: 11/451,414

(22) Filed: Jun. 13, 2006

(65) Prior Publication Data

US 2007/0217662 A1 Sep. 20, 2007

(30) Foreign Application Priority Data

Mar. 20, 2006 (JP) ................................ 2006-076629

(51) Int. Cl.
*G06K 9/00* (2006.01)

(52) U.S. Cl. ........................................................ 382/124

(58) Field of Classification Search .......... 382/115–124, 382/209, 218, 313; 178/18.01, 18.02, 18.03; 345/156, 179; 713/186; 902/3; 340/5.83
See application file for complete search history.

(56) References Cited

U.S. PATENT DOCUMENTS

| | | | |
|---|---|---|---|
| 6,282,303 B1 * | 8/2001 | Brownlee | 382/124 |
| 6,392,636 B1 * | 5/2002 | Ferrari et al. | |
| 6,724,366 B2 * | 4/2004 | Crawford | 345/157 |
| 7,324,672 B2 * | 1/2008 | Sato et al. | 382/124 |
| 7,394,453 B2 * | 7/2008 | Woolley et al. | 345/157 |
| 2001/0017934 A1 * | 8/2001 | Paloniemi et al. | |
| 2002/0005837 A1 * | 1/2002 | Thomason et al. | 345/169 |
| 2002/0122026 A1 * | 9/2002 | Bergstrom | |
| 2003/0035568 A1 * | 2/2003 | Mitev et al. | 382/124 |
| 2003/0038824 A1 * | 2/2003 | Ryder | 345/684 |
| 2004/0169637 A1 * | 9/2004 | Sato | 345/156 |
| 2005/0083298 A1 * | 4/2005 | Loh et al. | 345/156 |
| 2005/0213797 A1 * | 9/2005 | Umeda | |
| 2006/0101281 A1 * | 5/2006 | Zhang et al. | 713/186 |
| 2006/0239514 A1 * | 10/2006 | Watanabe et al. | 382/115 |
| 2009/0027351 A1 * | 1/2009 | Zhang et al. | 345/173 |
| 2009/0201257 A1 * | 8/2009 | Saitoh et al. | 345/173 |

FOREIGN PATENT DOCUMENTS

| | | | |
|---|---|---|---|
| EP | 0905646 | * | 3/1999 |
| JP | 11-161610 | * | 6/1999 |
| JP | 11-353107 | * | 12/1999 |
| JP | 2001-216084 | * | 8/2001 |

(Continued)

OTHER PUBLICATIONS

Japanese Notification of Reasons for Refusal, dated Sep. 21, 2010 and issued in corresponding Japanese Patent Application No. 2006-076629. A partial translation is attached for the Examiner's information.

(Continued)

*Primary Examiner* — Daniel G Mariam
(74) *Attorney, Agent, or Firm* — Fujitsu Patent Center (57) ABSTRACT

There is provided an electronic apparatus that can scroll an image on a display screen with a simple operation and in various modes. A glide point is provided and a fingerprint sensor is provided adjacently to the glide point. Scroll mode is changed in response to a touch of a finger or thumb on the glide point and a vertical or horizontal movement of the finger or thumb on the glide point and an image on the display screen is scrolled in response to an upward or downward movement of a finger or thumb on the fingerprint sensor.

8 Claims, 7 Drawing Sheets

FOREIGN PATENT DOCUMENTS

| | | | |
|---|---|---|---|
| JP | 2002-229738 | * | 8/2002 |
| JP | 2002-352234 | * | 12/2002 |
| JP | 2002-366300 | | 12/2002 |
| JP | 2003-298689 | * | 10/2003 |
| JP | 2004-038870 | * | 2/2004 |
| JP | 2004-272458 | * | 9/2004 |
| JP | 2005-284443 | * | 10/2005 |
| TW | 200629127 | * | 8/2006 |

OTHER PUBLICATIONS

"Main products sold so far (FMV-BIBLO LOOX T-series)", Publication Date: Apr., 2005 Partial Translation.

Rekimoto, Junichi "ThumbSense: Proposal of interaction technique for touch pad", Dec. 5, 2002. English-language Abstract and Partial Translation.

* cited by examiner

ELECTRONIC APPARATUS AND PROGRAM STORAGE MEDIUM

BACKGROUND OF THE INVENTION

1. Field of the Invention

The present invention relates to an electronic apparatus such as a personal computer and a program storage medium.

2. Description of the Related Art

Personal computers (hereinafter abbreviated as PC) are widely used in homes as well as offices in these days. One widely known form of the PC is the so-called notebook personal computer (hereinafter abbreviated as notebook PC) that has a body unit including on its top surface a keyboard and a glide point which detects a touch of a finger or thumb and a movement of the finger or thumb touching the glide point, and a display unit that can cover and uncover the body unit and includes a display screen. When used, the display unit is flipped open and held at an angle with respect to the body unit; when not used, the display unit is flipped closed so that the display screen is placed over the keyboard.

Increasingly higher levels of security are demanded of electronic apparatuses such as PC today. For example, a fingerprint sensor that detects fingerprints is provided on a notebook PC as described above, the fingerprint pattern of a fingertip is read by using the fingerprint sensor and, if it is determined that the read fingerprint pattern matches a fingerprint pattern registered beforehand, access to the notebook PC is granted. This makes cumbersome password authentication for security easy compared with a technique in which a password is inputted through a keyboard. A number of techniques for controlling access to PCs by identifying fingerprints have been proposed.

For example, a technique has been proposed in which the fingerprint pattern of a fingertip is obtained through use of a touch pad consisting of capacitance detecting cells arranged in a matrix and, if it is determined that the fingerprint pattern obtained matches a fingerprint pattern registered beforehand, access to the PC is granted, and a cursor or pointer on the display screen of the PC is controlled with a touch of the fingertip on the touch pad (see Japanese Patent Laid-Open No. 11-353107).

Another technique has been proposed in which a position sensor that detects the coordinates of the position of a finger and a fingerprint sensor are provided, information about the coordinates of the position of a finger detected by the position sensor is used to control a cursor on a screen, and information detected by the fingerprint sensor is used to control access to the PC (see Japanese Patent Laid-Open No. 2002-352234).

Yet another technique has been proposed which uses a capacitance-type sensor array to detect both of the fingerprint pattern of a fingertip and a movement of the finger and thereby implements both of the function of authenticating personal identification and the function of a pointing device (see Japanese Patent Laid-Open No. 2003-298689).

Yet another technique has been proposed in which the fingerprint pattern of a fingertip is scanned and the amounts of rotation and movement of the finger are detected by using a simple circuit configuration (see Japanese Patent Laid-Open No. 2004-272458).

Some notebook PCs, which are one type of electronic apparatus, include a glide point, left and right click buttons, and scroll up and down buttons provided between the click buttons. In these notebook PCs, four types of scroll operations can be performed by using combinations of the click buttons and scroll buttons.

In some known notebook PCs that include a fingerprint sensor, the fingerprint sensor includes a line sensor that detects the fingerprint of a finger or thumb placed on the line sensor and orthogonalized to the line sensor. In such a notebook PC, the fingerprint sensor, in addition to functioning as a detector of fingerprints, uses information indicating an upward (or downward) movement of a finger on the fingerprint sensor in order that fingerprint authentication can be performed to control access to the notebook PC and an image on the display screen can be scrolled on the basis of the information indicating the upward (or downward) movement of the finger on the fingerprint sensor.

However, the above-described notebook PCs that enables four types of scroll operations through use of combinations of the click buttons and scroll buttons has the problem of poor usability because one of the buttons must be pressed while another of the buttons is held down in order to perform any of the four scroll operations.

In the notebook PCs that include a line-type fingerprint sensor described above, an image on the display screen can be scrolled up by moving a finger upward on the line-type fingerprint sensor or be scrolled down by moving a finger downward. However, the notebook PC also has the problem of poor usability because, in scrolling up (or down) the image on the display screen, the scroll bar on the display screen can be moved upward (or downward) at a time only within a distance corresponding to the length of the fingertip and the user must move the finger upward (or downward) on the line-type fingerprint sensor a number of times in order to move the scroll bar upward (or downward) over a long distance. The line-type fingerprint sensor also has a problem that the scroll bar cannot be moved from side to side.

SUMMARY OF THE INVENTION

The present invention has been made in view of the above circumstances and provides an electronic apparatus that enables a user to scroll an image on a display screen with a simple operation and in various modes.

An electronic apparatus of the present invention includes:
a display screen which displays an image;
a glide point which detects a touch of a finger or thumb and a movement of the finger or thumb touching the glide point;
a fingerprint sensor which detects the fingerprint of a finger or thumb; and
a scroll control section which controls scrolling of the image on the display screen by using a combination of information detected by the glide point and information detected by the fingerprint sensor.

The electronic apparatus of the present invention detects a touch of a finger or thumb on the glide point and a movement of the finger or thumb touching the glide point, detects a movement of the finger or thumb on the fingerprint sensor, and controls scrolling of an image on a display screen by combining detection information indicated by the glide point and detection information indicated by the fingerprint sensor. Accordingly, scrolling of the image on the display screen can be performed in various modes by finger operations on the glide point and fingerprint sensor. Therefore, as compared to the conventional technique that requires an operation in which one of a click button and a scroll button is pressed while another button is pressed or the conventional technique in which an upward (or downward) movement of a finger on a fingerprint sensor must be repeated a number of times in order that a scroll bar can be moved upward (or downward) over a long distance, the technique of the present invention enables scrolling of the image on the display screen to be performed with a simple operation and in various modes.

Preferably, the scroll control section changes scroll mode in response to a touch of a finger or thumb on the glide point and a movement of the finger or thumb on the glide point and scrolls the image on the display screen in response to a movement of the finger or thumb on the fingerprint sensor.

Thus, a desired scrolling function can be readily selected.

In a preferable mode of the present invention, the scroll control section scrolls the image on the display screen in a first scroll mode in response to a movement of the finger or thumb moving on the fingerprint sensor at a speed lower than or equal to a predetermined speed in the first scroll mode, and changes the scroll mode to a second scroll mode in response to a movement of the finger or thumb moving on the fingerprint sensor at a speed exceeding the predetermined speed;

executes the second scroll mode in response to a movement of the finger on the fingerprint sensor in the second scroll mode; and changes the scroll mode to the first scroll mode in response to a touch of the finger or the thumb on the glide point.

With this configuration, a user can scroll up (or down) the image fast over a long distance by switching from a scroll up (scroll down) operation for moving the image upward (or downward) in the first scroll mode to a continuous scroll up (or scroll down) operation in the second scroll mode for example.

Preferably, the scroll control section scrolls the image on the display screen in a first scroll mode in response to a movement of the finger or thumb moving on the fingerprint sensor at a speed lower than or equal to a predetermined speed in the first scroll mode, and changes the scroll mode to a second scroll mode in response to a movement of the finger or thumb moving on the fingerprint sensor at a speed exceeding the predetermined speed and scrolls the image on the display screen in the second scroll mode; and changes the scroll mode to the first scroll mode in response to a touch of the finger on the glide point.

With this configuration, scroll mode can be quickly changed from the first to second by moving a finger on the fingerprint sensor at a speed higher than a predetermined speed. Thus, the usability can be improved.

Preferably, the glide point sensor and the fingerprint sensor are positioned adjacently to each other.

With this configuration, the usability can be improved because the finger movement distance from the glide point to the fingerprint sensor is short.

Preferably, the fingerprint sensor is a line-type fingerprint sensor which includes a line sensor and detects the fingerprint of a finger or thumb placed on the line sensor and moved in the orthogonal direction of the line sensor.

The provision of the line-type fingerprint sensor makes it possible to reduce the size of the electronic apparatus.

The problems described earlier can be also solved by a scroll control apparatus that controls scrolling by using the glide point and the fingerprint sensor in the electronic apparatus or a program that causes the electronic apparatus to function as the scroll control device.

According to the electronic apparatus of the present invention, an image on a display screen can be scrolled with a simple operation and in various modes.

DETAILED DESCRIPTION OF THE INVENTION

An embodiment of the present invention will be described below.

Figure 1:
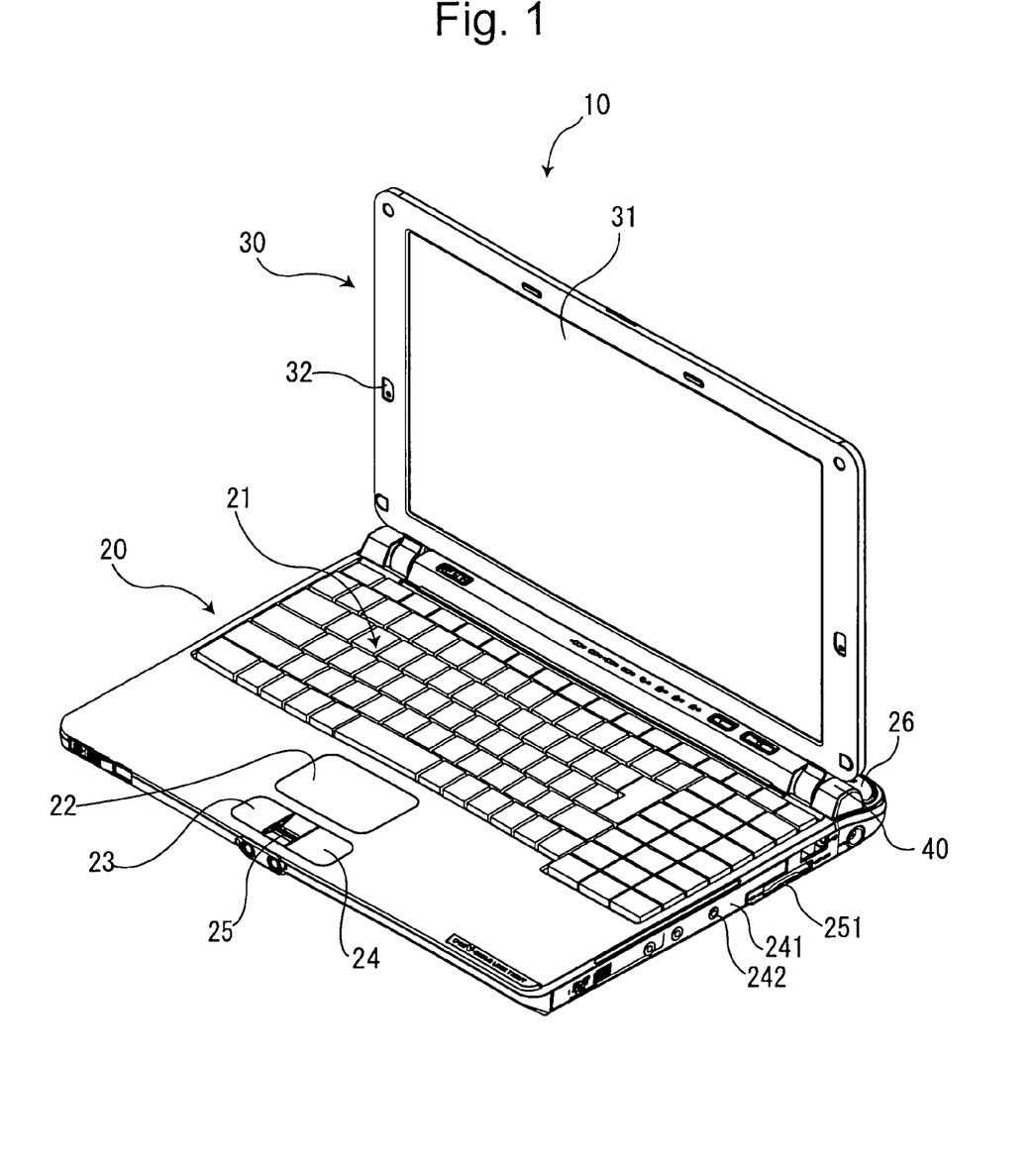
FIG. 1 is an external perspective view of a notebook PC which is one embodiment of an electronic apparatus according to the present invention.

FIG. 1 is an external perspective view of a notebook PC of one embodiment of an electronic apparatus of the present invention.

The notebook PC 10 has two housings including a body unit 20 and a display unit 30. The display unit 30 has a display screen 31 on which images are displayed and is supported by hinges 40 in such a manner that it can cover and uncover the body unit 20.

The body unit 20 has a keyboard 21 on its top surface. Also provided on the top surface of the body unit 20 are a glide point 22 which detects a touch of a finger or thumb and movement of the finger or thumb touching it, left and right click buttons 23, 24 which function as left and right mouse buttons respectively, and a fingerprint sensor 25 which detects fingerprints. The fingerprint sensor 25 is positioned between the left and right click buttons 23, 24.

The fingerprint sensor 25 is a line-sensor-type fingerprint sensor that includes a line sensor and detects the fingerprint of a finger or thumb that is placed on the line sensor and orthogonalized to the line sensor. Accordingly, the longitudinal size of the fingerprint sensor 25 is small, resulting in size reduction of the notebook PC 10. In addition, the glide point 22 and the fingerprint sensor 25 are positioned (vertically) adjacently to each other. Therefore, only a small movement of a finger is needed to reach the fingerprint sensor 25 from the glide point 22, which improves the usability.

Contained inside the housing of the body unit 20 is a main circuit board on which circuits such as a CPU that performs various kinds of processing are provided. In addition, exposed at the outer surface on the right-hand side of the body unit 20 is one edge 241 of a CD/DVD drive which rotates a CD or DVD removably loaded in it and accesses the rotating CD or DVD. An eject button 242 is provided on the edge 241 which, when pressed, causes the tray of the CD/DVD drive to slide out from the body unit.

Also provided on the right-hand side of the body unit 20 is a media slot 251 through which various types of storage media (such as SmartMedia (registered trademark) and xDcard (registered trademark)) are removably loaded and are accessed. A portion of the slot vertically overlaps the CD/DVD drive.

The display unit 30 has the above-mentioned display screen 31. Provided on the front cover surrounding the display screen 31 is an opening 32 for taking sound into a microphone (not shown) provided inside.

The hinges 40 have a structure that supports the display unit 30 in such a manner that it can cover and uncover the body unit 20.

A speaker 26 is provided behind the hinge 40 on the body unit 20.

Figure 2:
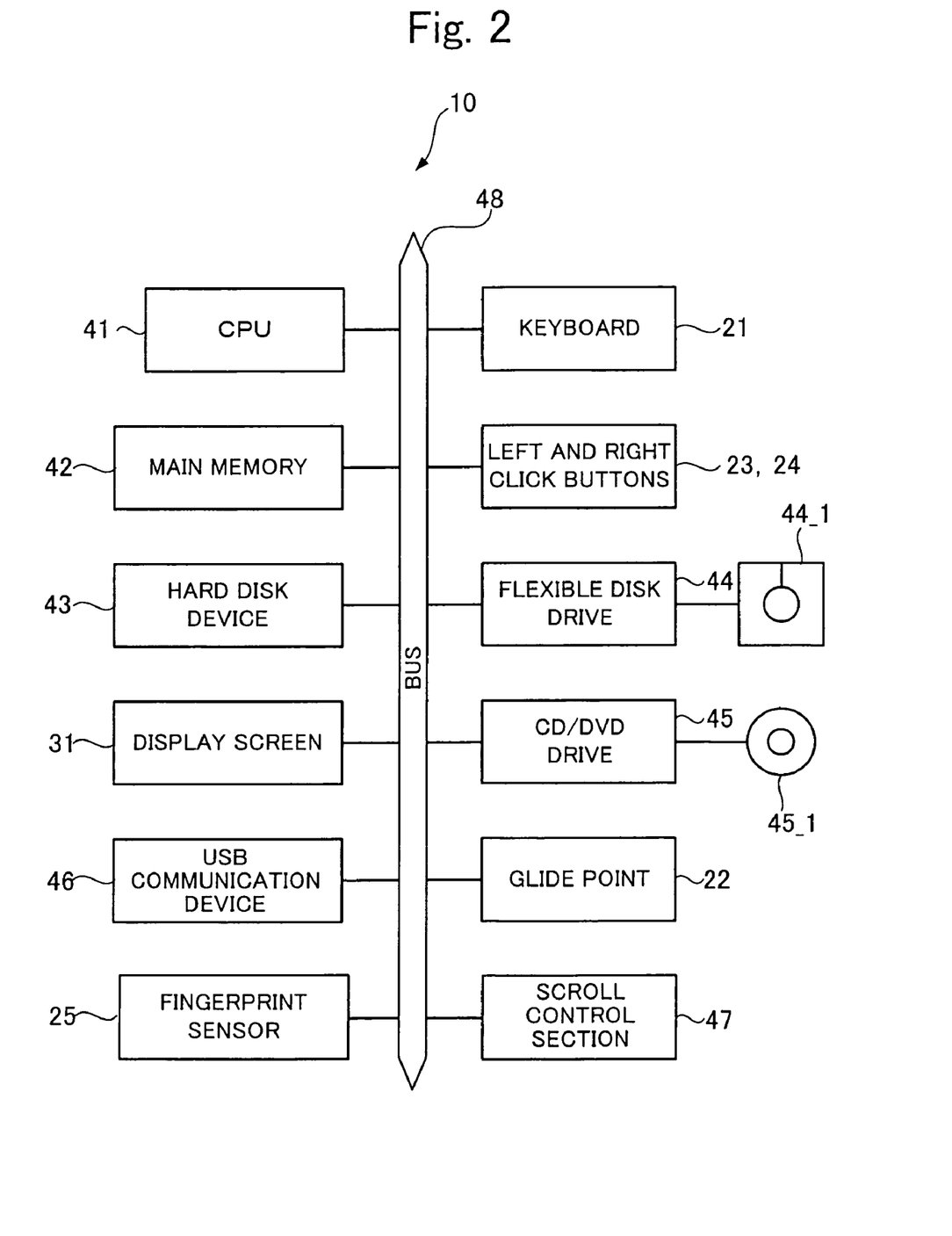
FIG. 2 schematically shows circuit blocks of the notebook PC shown in FIG. 1.

FIG. 2 schematically shows circuit blocks of the notebook PC shown in FIG. 1.

The notebook PC 10 shown in FIG. 2 includes a CPU 41 which executes various programs, a main memory 42 into which programs stored in a hard disk device 43 are read and loaded for execution by the CPU 41, the hard disk device 43 in which various programs and image data are stored, a flexible disk drive 44 into which a flexible disk 44_1 is loaded and which accesses the flexible disk 44_1 loaded in it, a CD/DVD drive 45 which accesses a CD/DVD 45_1, a USB communication unit 46 which is connected to a USB communication unit provided in another device such as a digital camera and obtains image data from the USB communication device, as well as the display screen 31, keyboard 21, left and right click buttons 23, 24, glide point 22, fingerprint sensor 25 described above and shown in FIG. 1, and a scroll control section 47, which will be described below. These components are interconnected through a bus 48.

The scroll control section 47 controls scrolling of an image on the display screen 31 by combining detection of a finger on the glide point 22 and detection of a finger on the fingerprint sensor 25.

In particular, the scroll control section 47 changes scroll mode in response to a touch of a finger or thumb and a movement of the finger or thumb on the glide point 22 and scrolls the image on the display screen 31 in response to a movement of a finger or thumb on the fingerprint sensor 25.

In addition, the scroll control section 47 scrolls the image on the display screen 31 in a first scroll mode in response to a movement of the finger moving on the fingerprint sensor 25 at a speed lower than or equal to a predetermined speed in the first scroll mode.

Moreover, the scroll control section 47 also changes the mode to a second scroll mode in response to a movement of the finger moving on the fingerprint sensor 25 at a speed higher than the predetermined speed and executes the second scroll mode operation in response to a movement of the finger on the fingerprint sensor 25 in the second scroll mode.

In addition, the scroll control section 47 also changes the mode to the first scroll mode in response to a touch of the finger on the glide point 22, thereby performing "reset operation". The scroll control will be described below with reference to FIGS. 3 and 4.

Figure 3:
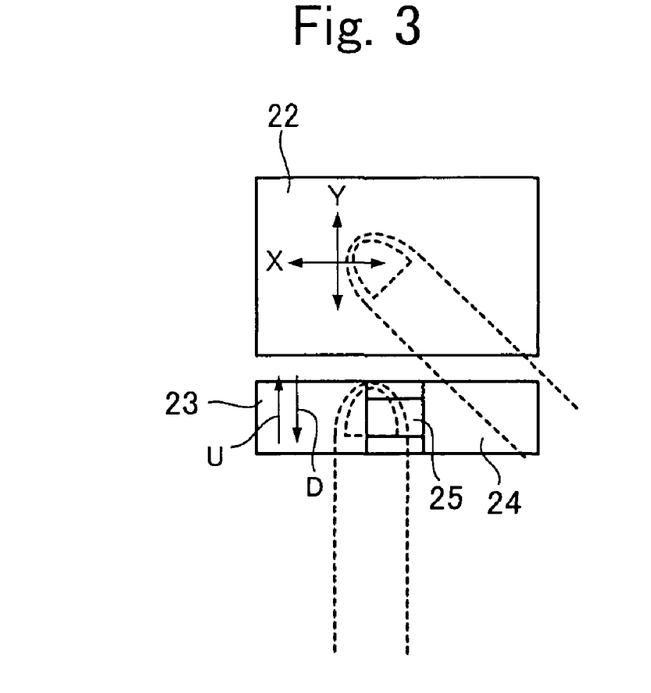
FIG. 3 is a diagram illustrating a movement of a finger on a glide point and a movement of a finger on a fingerprint sensor of the notebook PC of the present embodiment.
Figure 4:
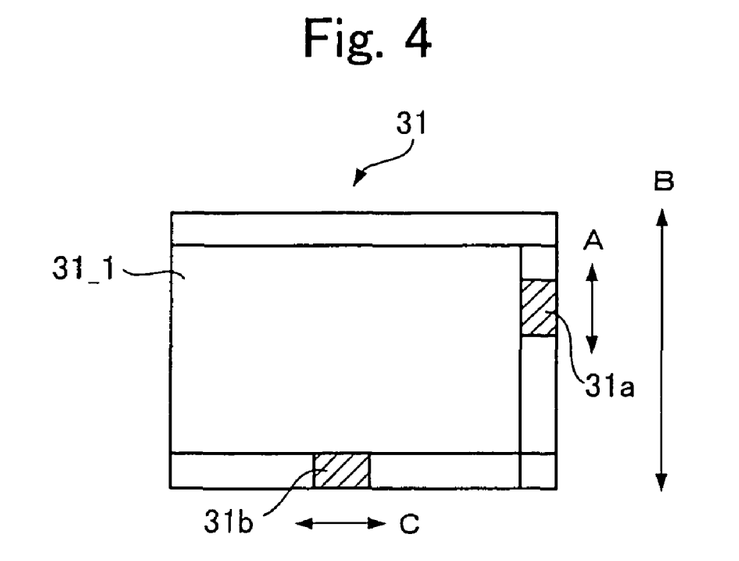
FIG. 4 is a diagram illustrating how scrolling of an image on a display screen is controlled by combining detection of a finger on the glide point and detection of a finger on the fingerprint sensor shown in FIG. 3.

FIG. 3 is a diagram illustrating a movement of a finger on the glide point and a movement of a finger on the fingerprint sensor of the notebook PC of the present embodiment; FIG. 4 is a diagram illustrating how scrolling of an image on the display screen is controlled by combining detection of a finger on the glide point shown in FIG. 3 and detection of a finger on the fingerprint sensor.

FIG. 3 shows the glide point 22, the left and right click buttons 23, 24 disposed under the glide point 22, and the fingerprint sensor 25 provided between the left and right click buttons 23, 24.

FIG. 4 shows the display screen 31. The display screen 31 has an image 31_1, a vertical scroll bar 31a, and a horizontal scroll bar 31b.

As shown in FIG. 3, as movement of a finger on the glide point 22, a touch of a finger on the glide point 22, horizontal finger movement indicated by arrow X, and vertical finger movement indicated by arrow Y are allowed in the present embodiment.

On the fingerprint sensor 25, as movement of a finger on the fingerprint sensor 25, on the other hand, an upward finger movement indicated by arrow U and a downward movement indicated by arrow D at speeds lower than or equal to a predetermined speed are allowed. In addition, upward (or downward) movement on the fingerprint sensor 25 at speeds higher than the predetermined speed is allowed. How scrolling of the image 31_1 on the display screen 31 of the notebook PC 10 of the present embodiment is controlled will be described below.

Figure 5:
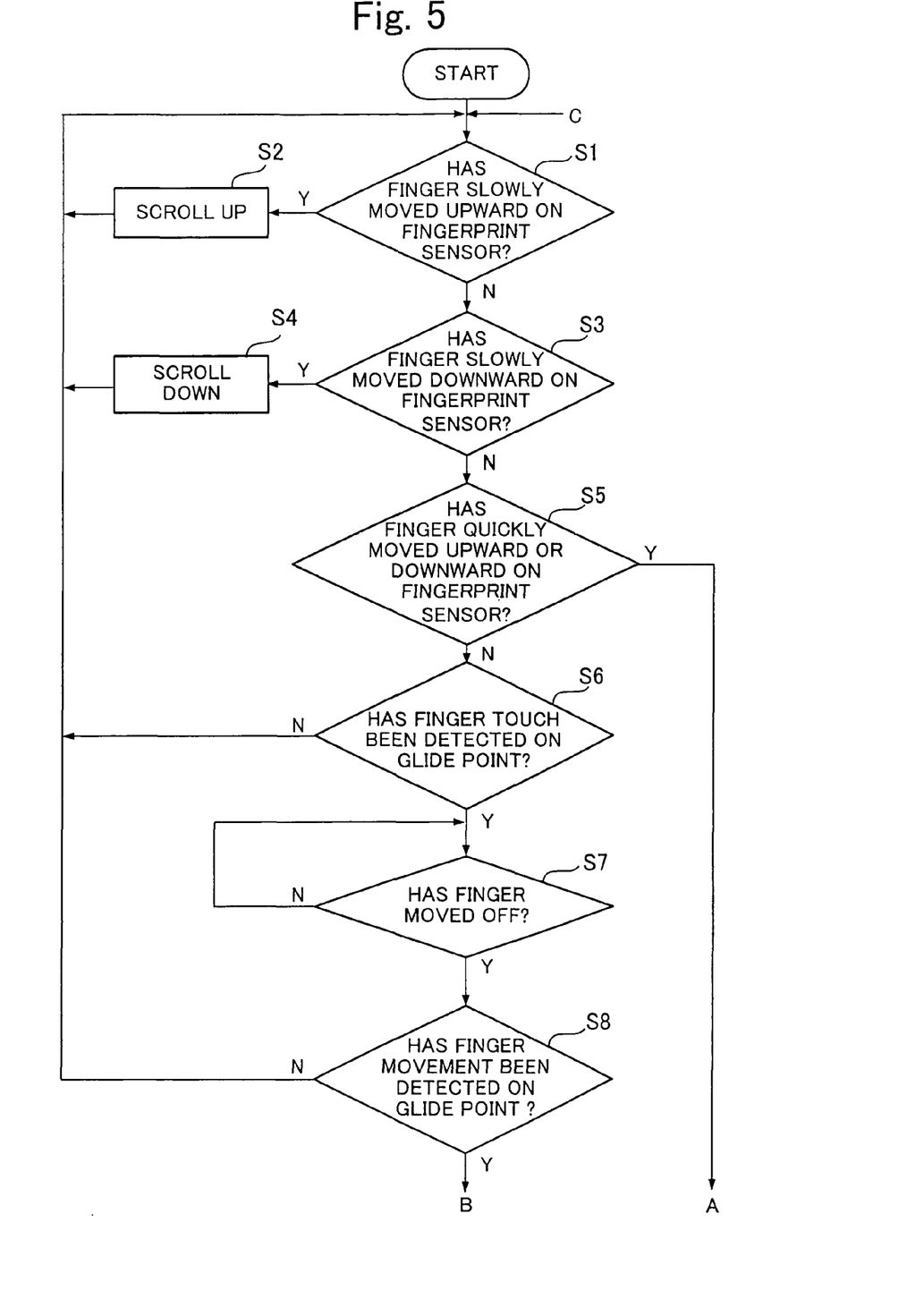
FIG. 5 is a flowchart of the first portion of a control routine for controlling scrolling of an image on the display screen of the notebook PC of the present embodiment.
Figure 6:
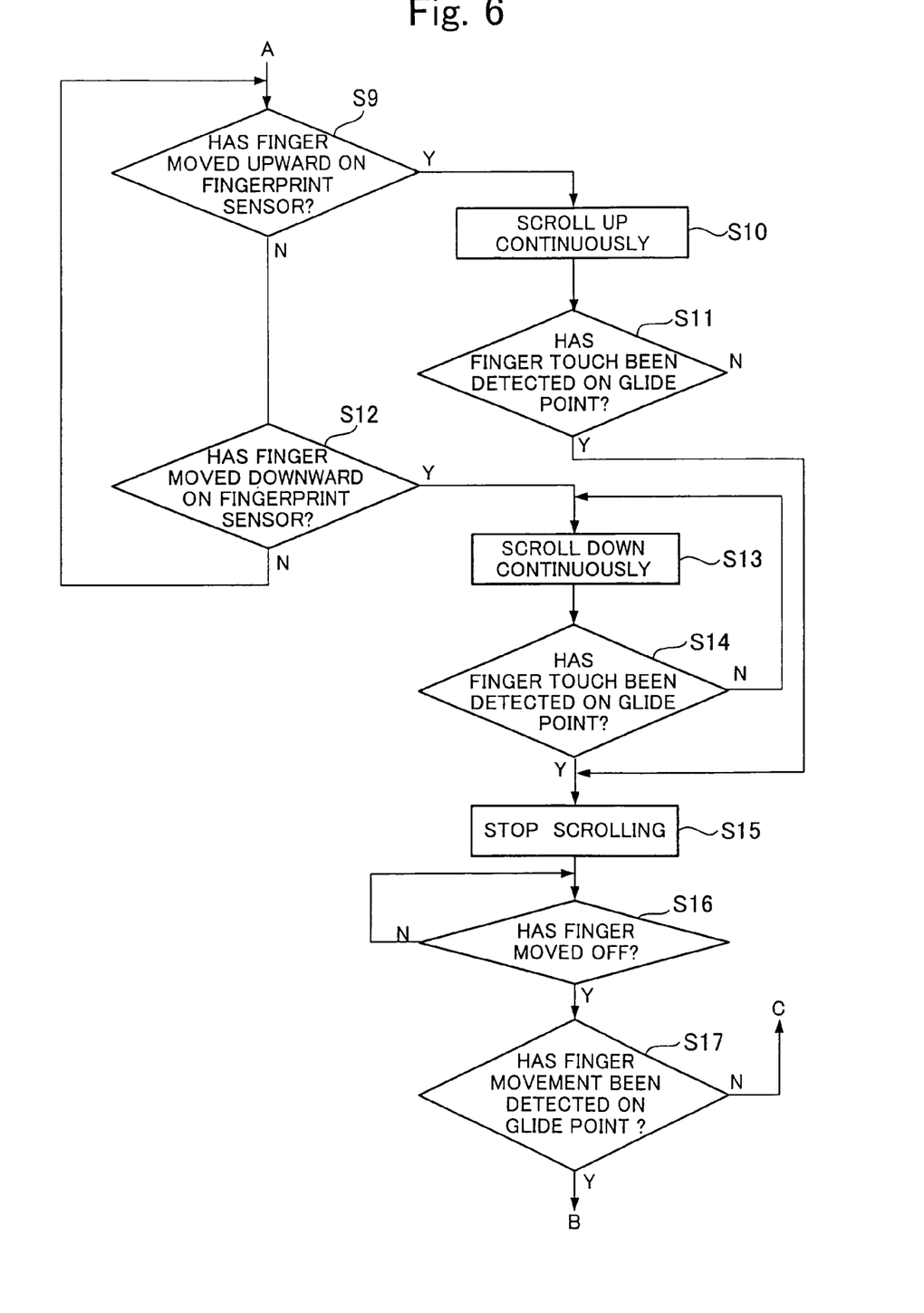
FIG. 6 is a flowchart of the middle portion of the control routine for controlling scrolling of the image on the display screen of the notebook PC of the present embodiment.
Figure 7:
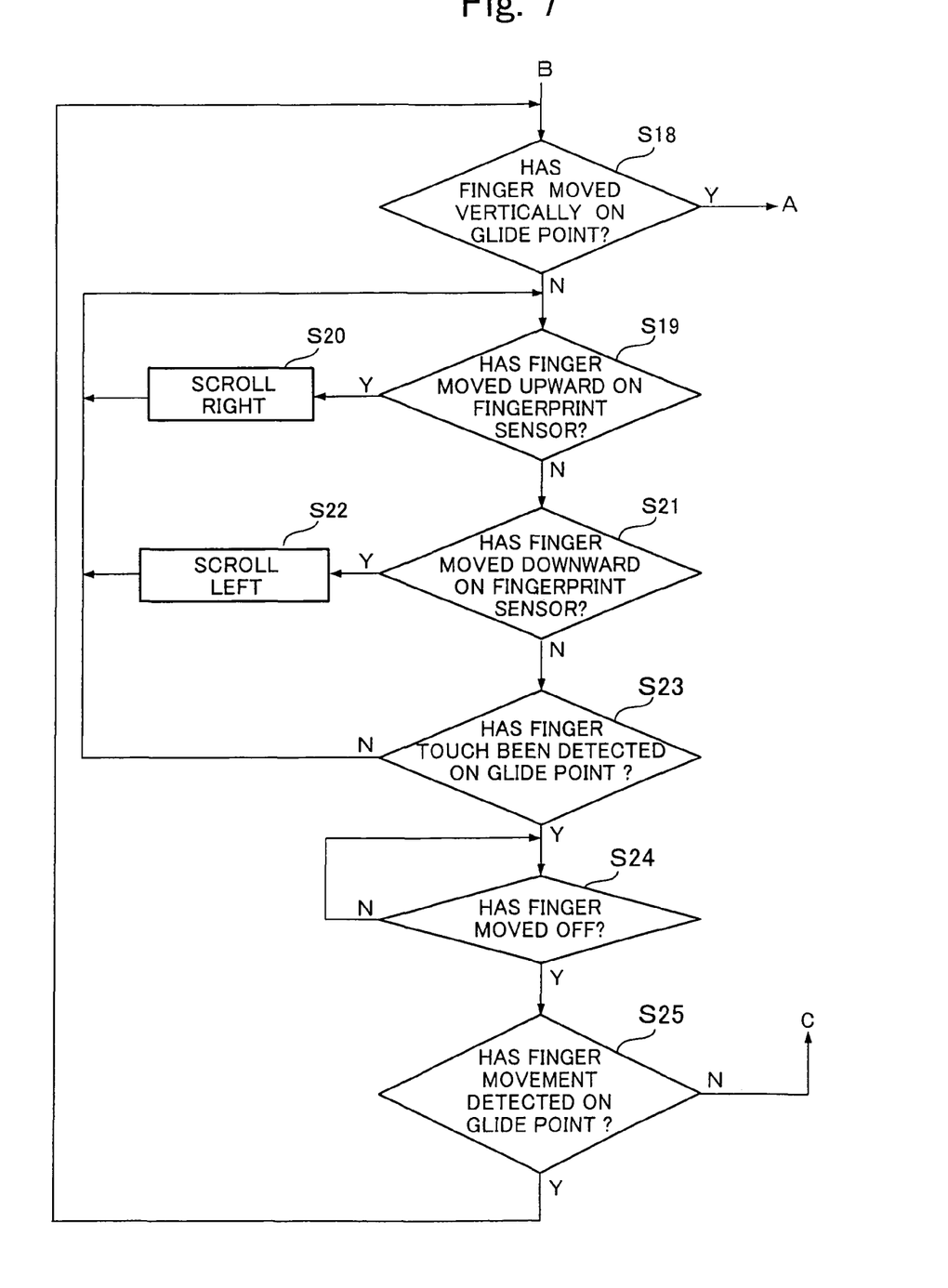
FIG. 7 is a flowchart of the last portion of the control routine for controlling scrolling of the image on the display screen of the notebook PC of the present embodiment.

FIGS. 5, 6, and 7 are a flowchart of the first portion of a control routine for controlling image scrolling on the display screen, a flowchart of the middle portion of the control routine, and the last portion of the control routine, respectively, of the notebook PC of the present embodiment.

On the notebook PC 10 of the present embodiment, first a regular processing routine is performed. In this routine, such processes described below are performed. That is, processing is performed in which a pointer displayed on the display screen 30 is moved in response to a finger touch on the glide point 22, the fingerprint pattern of the finger is read by the fingerprint sensor 25 and processing is performed in which if the read fingerprint pattern matches a fingerprint pattern registered beforehand, access to the notebook PC 10 is granted. Furthermore, processing for functioning as left and right mouse buttons in response to operation on the left and right click buttons 23, 24 is performed.

Here, when the left and right click buttons 23 and 24 are pressed at a time, the control routine is activated. It should be noted that the PC 10 can return to the regular processing routine when the left and right click buttons 23 and 24 are pressed again at a time.

After the processing routine is activated, determination is made first at step S1 as to whether the finger is moved upward on the fingerprint sensor at a speed lower than or equal to a predetermined speed (slowly). If it is determined that the finger is slowly moved upward, the process proceeds to step S2.

At step S2, the image on the display screen is scrolled upward (scroll up) and then the process returns to step S1. On the other hand, if it is determined that the finger is not moved slowly upward, the process proceeds to step S3.

At step S3, determination is made as to whether the finger is moved slowly downward on the fingerprint sensor. If it is determined that the finger is moved slowly downward, the process proceeds to step S4.

At step S4, the image on the display screen is scrolled downward (scroll down) and then the process returns to step S1. On the other hand, if it is determined that the finger is not moved slowly downward, the process proceeds to step S5.

At step S5, determination is made as to whether the finger is moved upward or downward at a speed exceeding the predetermined speed (quickly) on the fingerprint sensor. If it is determined that the finger is moved upward or downward quickly, the process proceeds to step S9 shown in FIG. 6, which will be described later. On the other hand, if it is determined that the finger is not moved upward or downward quickly, the process proceeds to step S6.

At step S6, determination is made as to whether a finger touch is detected on the glide point. If it is determined that a finger touch on the glide point is not detected, the process returns to step S1. On the other hand, if it is determined that a touch of the finger on the glide point is detected, the process proceeds to step S7.

At step S7, determination is made as to whether the finger is moved off the glide point. If it is determined that the finger is not moved off, step S7 is repeated. On the other hand, if it is determined that the finger is moved off, the process proceeds to step S8.

At step S8, determination is made as to whether a movement of the finger on the glide point is detected (whether two different sets of coordinates on the glide point are detected). If it is determined that no finger movement on the glide point is detected, the process returns to step S1. On the other hand, if it is determined that a movement of the finger on the glide point is detected, the process proceeds to step S18 shown in FIG. 7, which will be described later.

If it is determined at step S5 described above that the finger is moved upward or downward quickly and therefore the process proceeds to step S9 shown in FIG. 6, determination is made at step S9 as to whether the finger is moved upward on the fingerprint sensor. If it is determined that the finger is moved upward, the process proceeds to step S10.

At step S10, the image on the display screen is continuously scrolled upward (continuous upward scroll is performed) and then the process proceeds to step S11.

At step S11, determination is made as to whether a finger touch on the glide point is detected. If it is determined that a finger touch on the glide point is not detected, the process returns to step S10. On the other hand, if it is determined that a finger touch on the glide point is detected, the process proceeds to step S15, which will be described later.

If it is determined at step S9 that the finger is not moved upward on the fingerprint sensor, then the process proceeds to step S12. At step S12, determination is made as to whether the finger is moved downward on the fingerprint sensor. If it is determined that the finger is not moved downward, the process returns to step S9. On the other hand, if it is determined that the finger is moved downward, the process proceeds to step S13.

At step S13, the image on the display screen is continuously scrolled downward (continuous downward scroll is performed) and then the process proceeds to step S14.

At step S14, determination is made as to whether a finger touch on the glide point is detected. If it is determined that a finger touch on the glide point is not detected, the process returns to step S13. On the other hand, if it is determined that a finger touch on the glide point is detected, the process proceeds to step S15. At step S15, the continuous scrolling is discontinued and the process proceeds to step S16.

At step S16, determination is made as to whether the finger is moved off the glide point. If it is determined that the finger is not moved off the glide point, step S16 is repeated. On the other hand, if it is determined that the finger is moved off, the process proceeds to step S17.

At step S17, determination is made as to whether a movement of the finger on the glide point is detected. If it is determined that a movement of the finger on the glide point is not detected, the process returns to step S1. On the other hand, if it is determined that a movement of the finger on the glide point is detected, the process proceeds to step S18 shown in FIG. 7.

At step S18, determination is made as to whether the finger is moved vertically on the glide point. If it is determined that the finger is moved vertically, the process returns to step S9. That is, if it is determined that the finger is moved vertically on the glide point, the control is passed to the processing routine in which the continuous scrolling mentioned above is performed.

On the other hand, if it is determined at step S18 that the finger is not moved vertically on the glide point, that is, if it is determined that the finger is moved horizontally on the glide point, the process proceeds to step S19.

At step S19, determination is made as to whether the finger is moved upward on the fingerprint sensor. If it is determined that the finger is moved upward, the process proceeds to step S20, where the image on the display screen is scrolled to the right, and then the process returns to step S19. On the other hand, if it is determined that the finger is not moved upward, the process proceeds to step S21.

At step S21, determination is made as to whether the finger is moved downward on the fingerprint sensor. If it is determined that the finger is moved downward, the process proceeds to step S22. At step S22, the image on the display screen is scrolled to the left and then the process returns to step S19. On the other hand, if it is determined that the finger is not moved downward, the process proceeds to step S23.

At step S23, determination is made as to whether a finger touch on the glide point is detected. If it is determined that a finger touch on the glide point is not detected, the process returns to step S19. On the other hand, if it is determined that a finger touch on the glide point is detected, the process proceeds to step S24.

At step S24, determination is made as to whether the finger is moved off the glide point. If it is determined that the finger is not moved off, step S24 is repeated. On the other hand, if it is determined that the finger is moved off, the process proceeds to step S25.

At step S25, determination is made as to whether a movement of the finger on the glide point is detected. If it is determined that a movement of the finger on the glide point is not detected, the process returns to step S1. On the other hand, if it is determined that a movement of the finger on the glide point is detected, the process returns to step S18.

Figure 8:
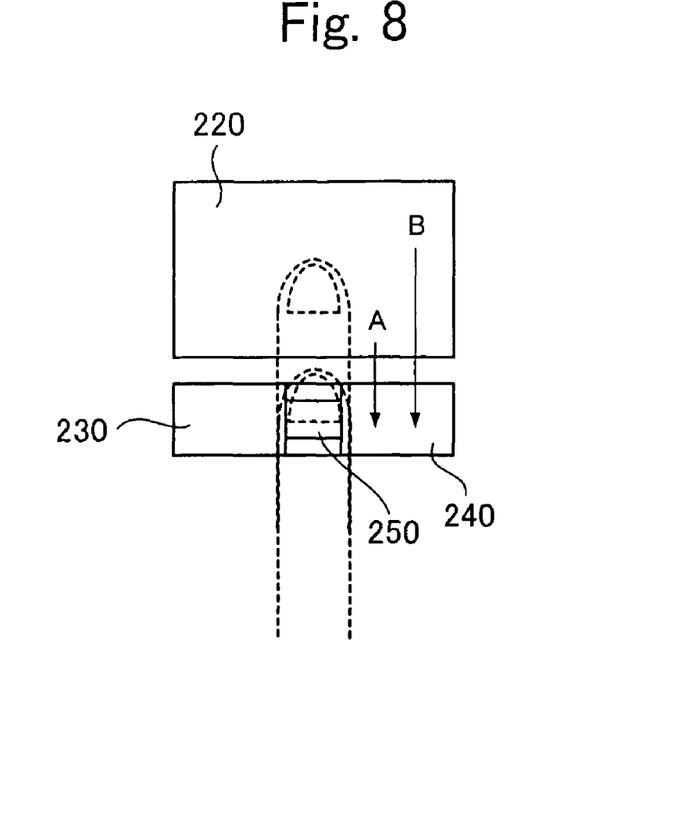
FIG. 8 shows a downward movement of a finger on a fingerprint sensor of a notebook PC as a comparative example.
Figure 9:
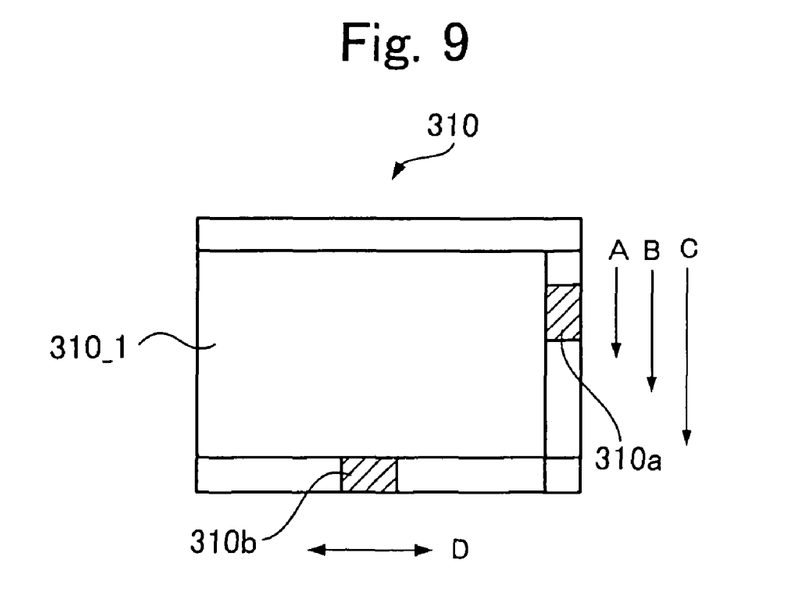
FIG. 9 is a diagram illustrating how scrolling of an image on the display screen is controlled by moving a finger downward on the fingerprint sensor shown in FIG. 6.

FIG. 8 shows a downward movement of a finger on a fingerprint sensor of a notebook PC as a comparative example and FIG. 9 is a diagram illustrating how scrolling of an image on the display screen is controlled by moving the finger downward on the fingerprint sensor shown in FIG. 8.

Shown in FIG. 8 are a glide point 220, left and right click buttons 230 and 240 disposed under the glide point 220, and a fingerprint sensor 250 provided between the left and right click buttons 230 and 240.

FIG. 9 shows a display screen 310. The display screen 310 has an image 310_1, a vertical scroll bar 310a, and a horizontal scroll bar 310b.

When the fingerprint sensor 250 in the notebook PC in the comparative example is used as a scroll button, moving a finger downward on the fingerprint sensor 250 as indicated by arrow A in FIG. 8 moves the scroll bar 310a shown in FIG. 9 downward in the range indicated by arrow A, thereby scrolling the image 310_1 downward on the display screen 310. On the other hand, moving a finger on the fingerprint sensor 250 upward, which is the direction opposite to the direction indicated by arrow A in FIG. 8, moves the scroll bar 310a upward, thereby scrolling up the image 310_1 on the display screen 310.

However, in scrolling down (or up) the image 310_1 on the display screen 310, the scroll bar 310a on the display screen 310 can be moved downward (or upward) at a time only within a distance (range indicated by the length of arrow A or B in FIG. 9) corresponding to the length of the fingertip (the range indicated by the length of arrow A or B in FIG. 8). In order to move the scroll bar downward (or upward) over a longer distance indicted by the length of arrow C in FIG. 9, the finger must be repeatedly moved downward (or upward) on the fingerprint sensor 250 a number of times. This consequently causes a cumbersome operation. Another problem with the notebook PC in the comparative example is that the horizontal scroll bar 310b shown in FIG. 9 cannot be moved from side to side.

In contrast, the notebook PC 10 of the present embodiment detects a touch of a finger or thumb on the glide point 22 and horizontal and vertical movements of the finger or thumb touching the glide point 22 as well as upward and downward movements of a finger or thumb on the fingerprint sensor 25, and controls scrolling of an image 31_1 on the display screen 31 by combining the detection of the finger or thumb on the glide point 22 and the detection of the finger or thumb on the finger print sensor 25. Therefore, one can scroll the image 31_1 on the display screen 31 in various forms by finger operations on the glide point 22 and on the fingerprint sensor 25 as described with reference to the flowcharts shown in FIGS. 5, 6, and 7. Therefore, as compared to the conventional technique that requires an operation in which one of a click button and a scroll button is held down and at the same time another button is pressed or the conventional technique in which an upward (or downward) movement of a finger on a fingerprint sensor must be repeated a number of times in order that a scroll bar can be moved upward (or downward) over a long distance, the technique of the present invention enables scrolling of the image 31_1 on the display screen 31 to be performed with a simple operation and in various modes.

While the present embodiment has been described with respect to an example in which a touch of a finger and vertical and horizontal movements of the finger on the glide point are detected, the present invention is not so limited. The glide point according to the present invention may be any glide point that detects a touch of a finger or thumb on the glide point and movements of the finger or thumb touching the glide point.

While the present embodiment has been described with respect to an example in which an upward or downward movement of a finger on a line-type fingerprint sensor is detected, the present invention is not so limited. The fingerprint sensor according to the present invention may be any type of fingerprint sensor that detects a fingerprint.

Furthermore, the present embodiment has been described with respect to an example of a scroll control section which scrolls an image on the display screen in a first scroll mode in response to a movement of a finger moving on the fingerprint sensor at a speed lower than or equal to a predetermined speed in the first scroll mode, changes the scroll mode to a second scroll mode in response to a movement of the finger moving on the fingerprint sensor at a speed exceeding the predetermined speed, and executes the second scroll mode in response to a movement of the finger on the fingerprint sensor in the second scroll mode. However, the present invention is not so limited. The scroll control section according to the present invention may scroll the image on the display screen in a first scroll mode in response to a movement of a finger moving on the fingerprint sensor at a speed lower than or equal to a predetermined speed in the first scroll mode, and change the scroll mode to a second scroll mode in response to a movement of the finger moving on the fingerprint sensor at a speed exceeding the predetermined speed and scroll the image on the display screen in the second screen mode. The scroll control section configured in this way can immediately change the scroll mode from the first scroll mode to the second scroll mode in response to a movement of a finger moving on the fingerprint sensor faster than a predetermined speed. Thus, the convenience of operation can be further improved.

What is claimed is:

1. An electronic apparatus comprising:
   a display screen which displays an image;
   a glide point which detects a touch of a finger or thumb and a movement of the finger or thumb touching the glide point;
   a fingerprint sensor which detects the fingerprint of a finger or thumb; and
   a scroll control section which controls scrolling of the image on the display screen by using a combination of information detected by the glide point and a movement of the fingerprint indicated by information detected by the fingerprint sensor.

2. The electronic apparatus according to claim 1, wherein the scroll control section changes scroll mode in response to a touch of a finger or thumb on the glide point and a movement of the finger or thumb on the glide point and scrolls the image on the display screen in response to a movement of the fingerprint indicated by the information detected by the fingerprint sensor.

3. The electronic apparatus according to claim 1, wherein the scroll control section scrolls the image on the display screen in a first scroll mode in response to the movement of the fingerprint being detected as moving on the fingerprint sensor at a speed lower than or equal to a predetermined speed in the first scroll mode, and changes the scroll mode to a second scroll mode in response to the movement of the fingerprint being detected as moving on the fingerprint sensor at a speed exceeding the predetermined speed;
   executes the second scroll mode in response to the detected movement in the second scroll mode; and
   changes the scroll mode to the first scroll mode in response to a touch of the finger or the thumb on the glide point.

4. The electronic apparatus according to claim 1, wherein the scroll control section scrolls the image on the display screen in a first scroll mode in response to the movement of the fingerprint being detected as moving on the fingerprint sensor at a speed lower than or equal to a predetermined speed in the first scroll mode, and changes the scroll mode to a second scroll mode in response to the movement of the fingerprint being detected as moving on the fingerprint sensor at a speed exceeding the predetermined speed and scrolls the image on the display screen in the second scroll mode; and
   changes the scroll mode to the first scroll mode in response to a touch of the finger on the glide point.

5. The electronic apparatus according to claim 1, wherein the glide point and the fingerprint sensor are positioned adjacently to each other.

6. The electronic apparatus according to claim 1, wherein the fingerprint sensor is a line-type fingerprint sensor which includes a line sensor and detects the fingerprint of a finger or thumb placed on the line sensor and moved in the orthogonal direction of the line sensor.

7. A scroll control apparatus used in an electronic apparatus having a display screen which displays an image, a glide point which detects a touch of a finger or thumb and a movement of the finger or thumb touching the glide point, and a fingerprint sensor which detects the fingerprint of a finger or thumb, the scroll control apparatus comprising:
   a scroll control section which controls scrolling of the image on the display screen by using a combination of information detected by the glide point and a movement of the fingerprint indicated by information detected by the fingerprint sensor.

8. A non-transitory computer-readable program storage medium that stores a program to be executed on an electronic apparatus having a display screen which displays an image, a glide point which detects a touch of a finger or thumb and a movement of the finger or thumb touching the glide point, and a fingerprint sensor which detects the fingerprint of a finger or thumb, the program causing the electronic apparatus to function as:

a scroll control section which controls scrolling of the image on the display screen by using a combination of information detected by the glide point and a movement of the fingerprint indicated by information detected by the fingerprint sensor.

* * * * *